Dec. 10, 1957  D. W. MORRIS  2,815,680
MASTER AND LINK CONNECTING ROD SYSTEM
Filed Nov. 22, 1954
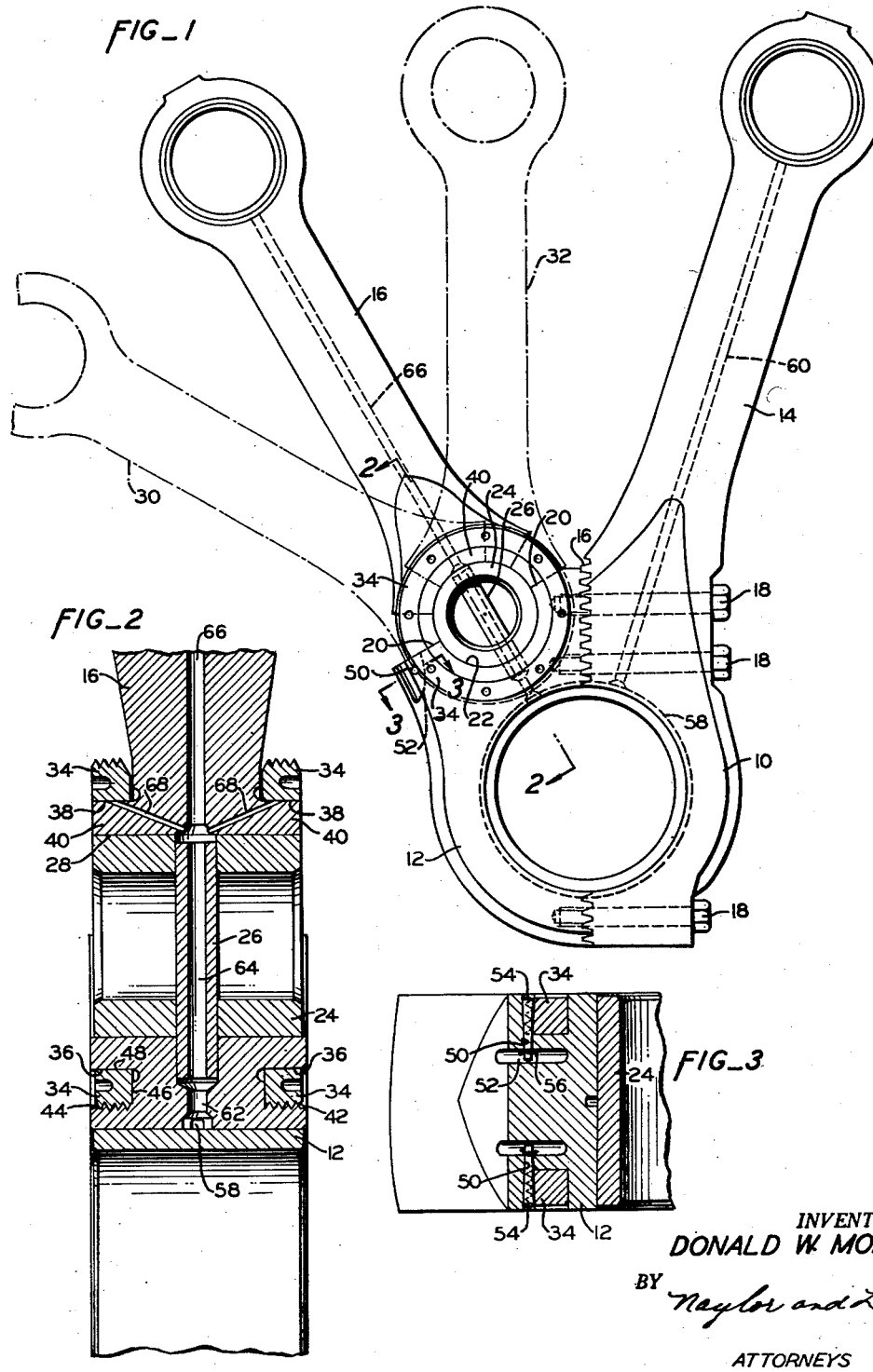
INVENTOR.
DONALD W. MORRIS
BY
ATTORNEYS United States Patent Office 2,815,680
Patented Dec. 10, 1957

2,815,680

MASTER AND LINK CONNECTING ROD SYSTEM

Donald W. Morris, Berkeley, Calif., assignor to The Enterprise Division of General Metals Corporation, San Francisco, Calif., a corporation of California Application November 22, 1954, Serial No. 470,311

5 Claims. (Cl. 74—580)

This invention relates to motive power equipment, such as diesel engines, and more particularly to a master and link connecting rod system which is particularly adapted for use with high power V-type diesel engines.

In connection with the V-type engines, it is desirable that the cylinders of one bank be transversely aligned with the cylinders of the other bank, thereby avoiding the staggering of the cylinders of the two banks and providing a more compact arrangement with respect to overall engine length. Prior structural arrangement adapting a master and link rod combination to be disposed on a single crank bearing of a crankshaft have solved this problem as to engine length in a broad sense. The subject invention is therefore directed to an improved structural arrangement, from the standpoint of strength and durability, of a master and link rod system adapted to be disposed on a single crankshaft bearing.

Other objects and advantages of the invention will be made apparent from the following description taken in conjunction with the drawing forming part of this specification, and in which:

Figure 1 as a view in front elevation of a master and link rod system embodying the invention, with the link rod being shown in dotted line positions indicative of its two extremes of operative movement;

Figure 2 is an enlarged detail view in section taken along lines 2—2 of Figure 1; and Figure 3 is an enlarged detail view in section taken along lines 3—3 of Figure 1.

With reference to the drawing, the master and link rod system comprises a pair of complemental crankshaft bearing embracing portions 10 and 12, a master rod 14 integral with bearing half 10 and immovably related to bearing half 12, and a link rod 16 pivotally related to bearing half 12. The interfaces of bearing halves 10 and 12 are provided with interfitting tooth-like serrations 16 adapted to prevent relative movement vertically between the bearing halves, and the bearing halves are secured together by a plurality of bolts 18.

The upper face 20 of bearing half 12 is provided with a semi-cylindrical depression 22 within which there is seated an annular bearing 24, the latter being secured against rotative and endwise movement with respect to bearing half 12 by pin 26 which extends transversely through the bearing and into bearing half 12. The lower end of link rod 16 has an arcuate surface 28 engaging 120° of the upper half of bearing 24, and means, now to be described, are provided to secure link rod 16 to bearing half 12 for pivotal movement between the limits indicated by the dotted line showings 30 and 32 of link rod 16.

Means for securing link rod 16 to bearing half 12 for pivotal movement with respect thereto comprise a pair of externally threaded rings 34 which are threadably engaged with internally threaded 180° grooves 36 formed in bearing half 12, with the internal smooth surfaces 38 of rings 34 being in bearing engagement with arcuate flange portions 40 formed on the lower end of link rod 16.

The rings 34 are disposed in tightened relation within grooves 36 so that the wedging action between the threads 42 formed on rings 34 and the threads 44 formed within grooves 36 causes a very tight engagement between the rings and bearing half 12 at the interfaces 46 and 48.

When the rings 34 have been brought into tightly threaded relation with bearing half 12, they are secured against loosening movement. For the purpose of locking the rings 34 and bearing half 12 together, tapered bores 50 common to both bearing half 12 and rings 34 are formed in the assembly, and milled slots 52 are formed in bearing half 12 in intersecting relation with the inner ends of tapered bores 50. Taper pins 54 provided with cotter pin receiving passages at their lower ends are then tapped into place within bores 50, following which cotter pins 56 are inserted by way of slots 52 into pins 54.

Oil passages, such as those indicated at 58, 60, 62, 64, 66 and 68, are formed in the various elements of the assembly.

The ring nut connector arrangement comprised in the described embodiment of the invention provides the following operational advantages over the connection means heretofore utilized to connect a link rod to a master rod: the positive and tight interlock between rings 34 and bearing half 12 prevents any free play from developing between the link rod and the balance of the assembly as a result of extensive use; and the large connector area offered by the rings 34 results in a relatively small stress loading of the rings. The fundamental structural advantage of the invention, as far as an engine embodying the same is concerned, is that the bearing area of bearing 24, against which the firing force applied to a piston is reacted, may be, and desirably is, made the same as the piston wrist pin bearing area without the necessity, as is the case with the conventional link to master rod connection, of increasing the length of the crank pin engaging portion of the rod assembly over that of a standard in-line engine. The conventional link to master rod connection embodies a link pin which pins the link rod between spaced portions of the crank pin bearing end of the master rod, and hence to increase the bearing area of the link pin it is necessary to increase the length of the pin and to consequently increase the crankshaft engaging dimension of the rod assembly. This in turn makes for a longer, heavier and more expensive engine.

What is claimed is:

1. For a V-type engine, a master and link connecting rod system comprising first and second complemental bearing sections, means for connecting said bearing sections together in embracing relation with a crank shaft bearing, a master rod integral with said first bearing section, a link rod, and means pivotally connecting said link rod to said second bearing section comprising a semi-cylindrical recess formed in the upper end of said second bearing section, an annular bearing having the lower half thereof seated within said recess and having the upper half thereof extending above said second bearing section, said link rod having its lower end formed complemental to and being in peripheral engagement with less than the entire circumferential area of the upper half of said annular bearing, arcuate side flanges formed on the lower end of said link rod, and a pair of rings disposed concentrically of said annular bearing, said rings being fixedly engaged within semi-circular grooves formed in the sides of the upper end of said second bearing section and being in embracing relation with said arcuate flanges of said link rod.

2. A master and link connecting rod system as set forth in claim 1, including means for securing said annular bearing against both rotative and endwise movement with respect to said second bearing section.

3. A master and link connecting rod system as set forth in claim 2, said rings being threadably engaged within said grooves, and including means locking said rings in tightly threaded engagement with said second bearing section.

4. A master and link connecting rod system comprising a pair of complemental bearing sections, means for securing said sections together in embracing relation to a crank shaft crank pin, a master rod immovably related to one of said sections, a link rod, and means pivotally relating said link rod to the other of said bearing sections comprising: a semi-cylindrical concavity formed in the upper end of the other of said bearing sections; an externally cylindrical bearing member having a radius of curvature corresponding to that of said concavity seated within said concavity; said link rod having a concave lower end, with a radius of curvature corresponding to that of said bearing, in engagement with approximately 120° of the periphery of said bearing; a pair of semi-annular internally threaded grooves formed in the sides of the upper end of the other of said bearing sections; and externally threaded annular rings disposed in said grooves in threaded connection therewith and in concentric relation with said bearing, with said rings being in contactual and embracing relation with arcuate flanges formed at the sides of the lower end of said link rod, said flanges having radii of curvature at their convex sides corresponding to that of the inside surfaces of said rings.

5. Apparatus of the class described comprising hub means adapted to be disposed in sleeved relation with a crank pin of a crankshaft, a semi-cylindrical groove formed in an outer portion of said hub means, said groove having its axis of curvature disposed parallel to the bearing axis of said hub means, an externally cylindrical bearing member nested within said groove, a connecting rod having its lower end formed complemental to the surface of said bearing member and disposed in engagement with less than 180° of arc of the surface of said bearing member, and a ring in concentric relation to said bearing member disposed in inset threaded relation with said hub means and in embracing contactual relation with a laterally extending arcuate flange formed on the lower end of said connecting rod.

References Cited in the file of this patent

UNITED STATES PATENTS

| 1,300,023 | Riegel | Apr. 8, 1919 |
| 1,687,917 | Woolson | Oct. 16, 1928 |
| 1,734,244 | Bingman | Nov. 5, 1929 |

FOREIGN PATENTS

| 95,345 | Germany | Mar. 3, 1897 |